United States Patent [19]

Wirtz et al.

[11] Patent Number: 5,075,768

[45] Date of Patent: Dec. 24, 1991

[54] METHOD AND APPARATUS FOR COLOR SEPARATION SCANNING

[75] Inventors: John S. Wirtz, Henrietta, N.Y.; Peter J. Neilson, Stroud, England

[73] Assignee: Itek Graphix Corporation, Waltham, Mass.

[21] Appl. No.: 657,352

[22] Filed: Feb. 15, 1991

Related U.S. Application Data

[63] Continuation of Ser. No. 240,758, Sep. 2, 1988, abandoned.

[51] Int. Cl.$^5$ .............................................. H04N 1/46
[52] U.S. Cl. .................................... 358/75; 358/496
[58] Field of Search .................. 358/78, 80, 75, 474, 358/494, 496, 497, 447, 448, 452, 463; 355/326

[56] References Cited

U.S. PATENT DOCUMENTS

| | | | |
|---|---|---|---|
| 3,646,262 | 2/1972 | Moe | 178/6.7 R |
| 4,231,069 | 10/1980 | Wellendorf et al. | 358/256 |
| 4,393,399 | 7/1983 | Gast et al. | 358/80 |
| 4,456,924 | 6/1984 | Rosenfeld | 358/75 |
| 4,516,155 | 5/1985 | Hennig et al. | 358/80 |
| 4,518,988 | 5/1985 | Saitoh et al. | 358/75 |
| 4,656,525 | 4/1987 | Norris | 358/76 |
| 4,729,016 | 3/1988 | Alhofer | 358/75 |
| 4,766,463 | 8/1988 | Watanuki et al. | 355/326 |
| 4,782,390 | 11/1988 | Hayashi et al. | 358/80 |
| 4,827,335 | 5/1989 | Saito et al. | 358/80 |
| 4,899,214 | 2/1990 | Robbins et al. | 358/496 |

FOREIGN PATENT DOCUMENTS

| | | |
|---|---|---|
| 0030271 | 2/1983 | Japan. |
| 0080965 | 5/1983 | Japan. |
| 0101962 | 6/1984 | Japan. |
| 0142666 | 7/1985 | Japan. |
| 0274583 | 12/1986 | Japan. |

OTHER PUBLICATIONS

Itek Colour Graphics, Ltd., Itek 200-S Technical Manual, Nov. 1984, pp. i-v, 2.1-2.5, 3.1-3.3, 4.1-4.14, 5.1-5.2, and block diagram.

*Primary Examiner*—Edward L. Coles, Sr.
*Assistant Examiner*—Jerome Grant, II
*Attorney, Agent, or Firm*—Morgan & Finnegan

[57] ABSTRACT

A method and apparatus for color separation scanning wherein a workpiece is movably supported and scanned by a linear detector. At least one color filter is interposed in the optical path between the workpiece and the linear detector and multiple scans are taken of a linear portion of the workpiece. The data obtained from multiple scans are averaged and stored in memory. A second memory may be provided to accept data input during a scan of a subsequent portion of the workpiece while the data in the first memory is output to a print device.

29 Claims, 6 Drawing Sheets

SH. 1/2

SH.2/2

METHOD AND APPARATUS FOR COLOR SEPARATION SCANNING

This is a continuation of co-pending application Ser. No. 07/240,758, filed on Sept. 2,1988, now abandoned.

TECHNICAL FIELD

This invention relates to electronic color separation scanners and, more particularly, to a system for operating the color scanner described in copending U.S. patent application Ser. No. 07/241-101 now U.S. Pat. No. 4,899,214 entitled LOW COST COLOR SCANNER.

BACKGROUND OF THE INVENTION

Multiple color printing processes require production of color halftone separations which are used to make printing plates corresponding to each color ink to be printed. In a traditional four color printing process it is necessary to produce cyan, magenta, yellow and black halftone separations which are used to make printing plates for printing cyan, magenta, yellow and black process inks, respectively.

Originally, halftone separations were produced on a camera by exposing original color artwork sheets of film through color separation filters and appropriate halftone screens having the desired screen angles and screen pitch. This method obtained relatively inexpensive production of halftone separations, but was tedious, time consuming and required extensive operator training. With the advent of reliable electronic scanners, color separations are no longer produced using a camera.

An electronic color scanner typically includes a rotating scanning drum for analyzing original artwork and an electronic dot generator for exposing halftones. In operation, the color scanner scans original color artwork to obtain red, green and blue color data, processes and stores the information for the entire workpiece, and thereafter electronically exposes cyan, magenta, yellow and black halftone separations. Available electronic color scanners typically utilize a laser dot generator to expose the halftone separations onto film wrapped around a rotating exposure drum. Unfortunately, electronic color scanners are very complex and require substantial training and experience to operate. Electronic color scanners are also very expensive, which makes them economically unfeasible for most printers interested in producing color halftone separations, resulting in the common practice to contract his service to a color separation house.

SUMMARY OF THE INVENTION

With the foregoing in mind, it is an object of the invention to provide a data input method and apparatus for a relatively inexpensive color separation scanner that minimizes data input errors.

It is a further object of the invention to provide a data input method and apparatus for a color separation scanner that allows movement of a workpiece to be scanned in a continuous motion.

It is a further object of the invention to provide a color separation scanner that transfers data from the input detector to the output printer in a substantially continuous data stream.

Additional objects and advantages of the invention are set forth in part herein and in Part will be obvious herefrom, or may be learned by practice with the invention, the same being realized and attained by means of the instrumentalities and combinations pointed out in the appended claims.

In accordance with the instant invention, a workpiece is movably supported and scanned by a linear detector. At least one color filter is interposed in the optical path between the workpiece and the linear detector and multiple scans are taken of a linear portion of the workpiece. The data obtained from the multiple scans are averaged and stored in memory.

In accordance with another aspect of the invention a workpiece is movably supported and scanned by a linear detector. At least one color filter is interposed in the optical path between the workpiece and the linear detector. The data obtained from a scan of a first linear portion of the workpiece is stored in a first storage means and, when starting a scan of a new linear portion of the workpiece, the data from the new portion is stored in a second storage means thereby allowing the first storage means to be output to a print device.

The invention consists in the novel parts, constructions, arrangements, combinations, steps and improvements herein shown and described.

BRIEF DESCRIPTION OF THE DRAWINGS

The accompanying drawings, referred to herein and constituting a part hereof, illustrate a preferred embodiment of the invention and, together with the description, serve to explain the principles of the invention, wherein.

DETAILED DESCRIPTION OF THE PREFERRED EMBODIMENT

Figure 1:
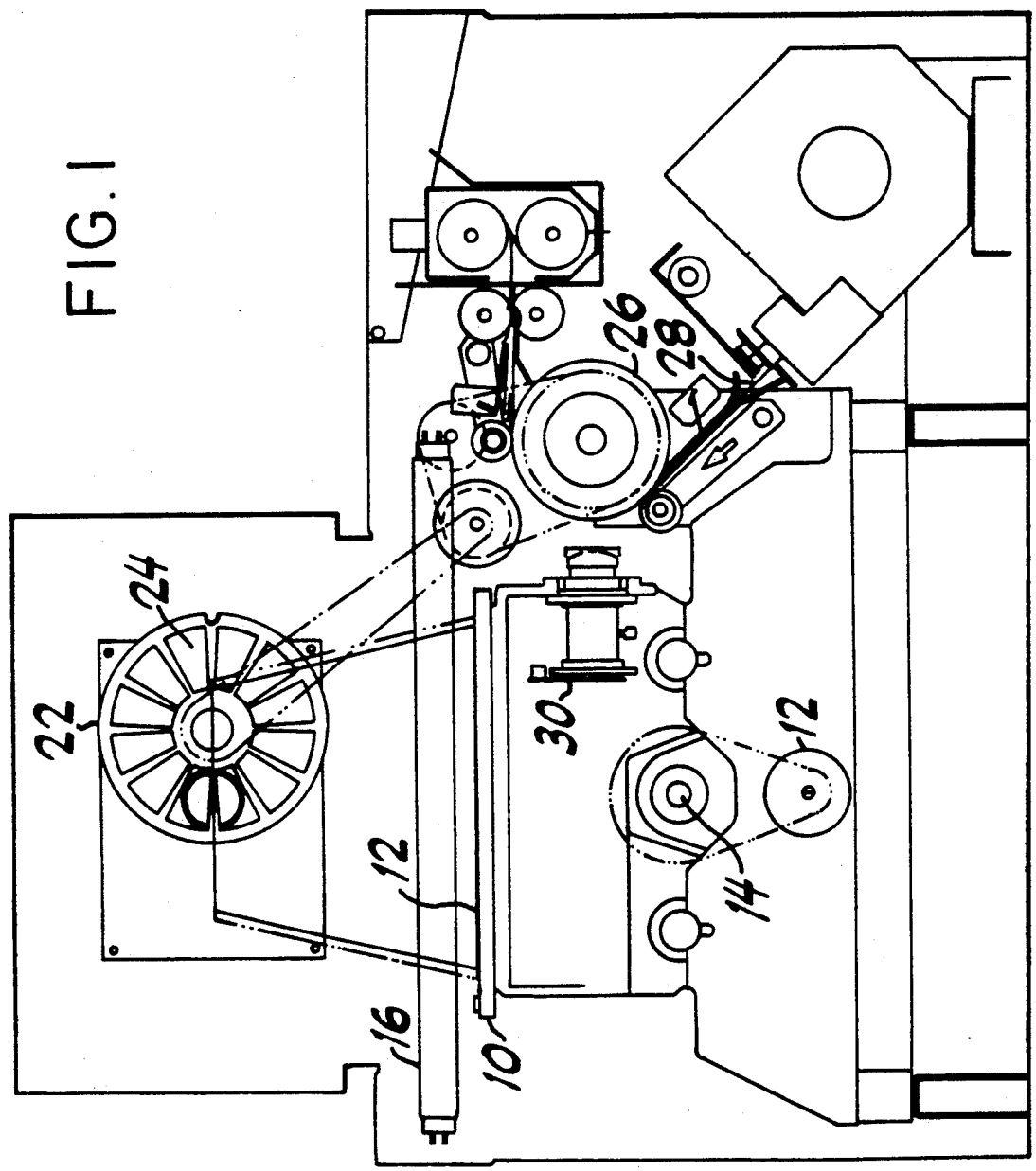
FIG. 1 is a front sectional view of a scanner according to the invention.
Figure 2:
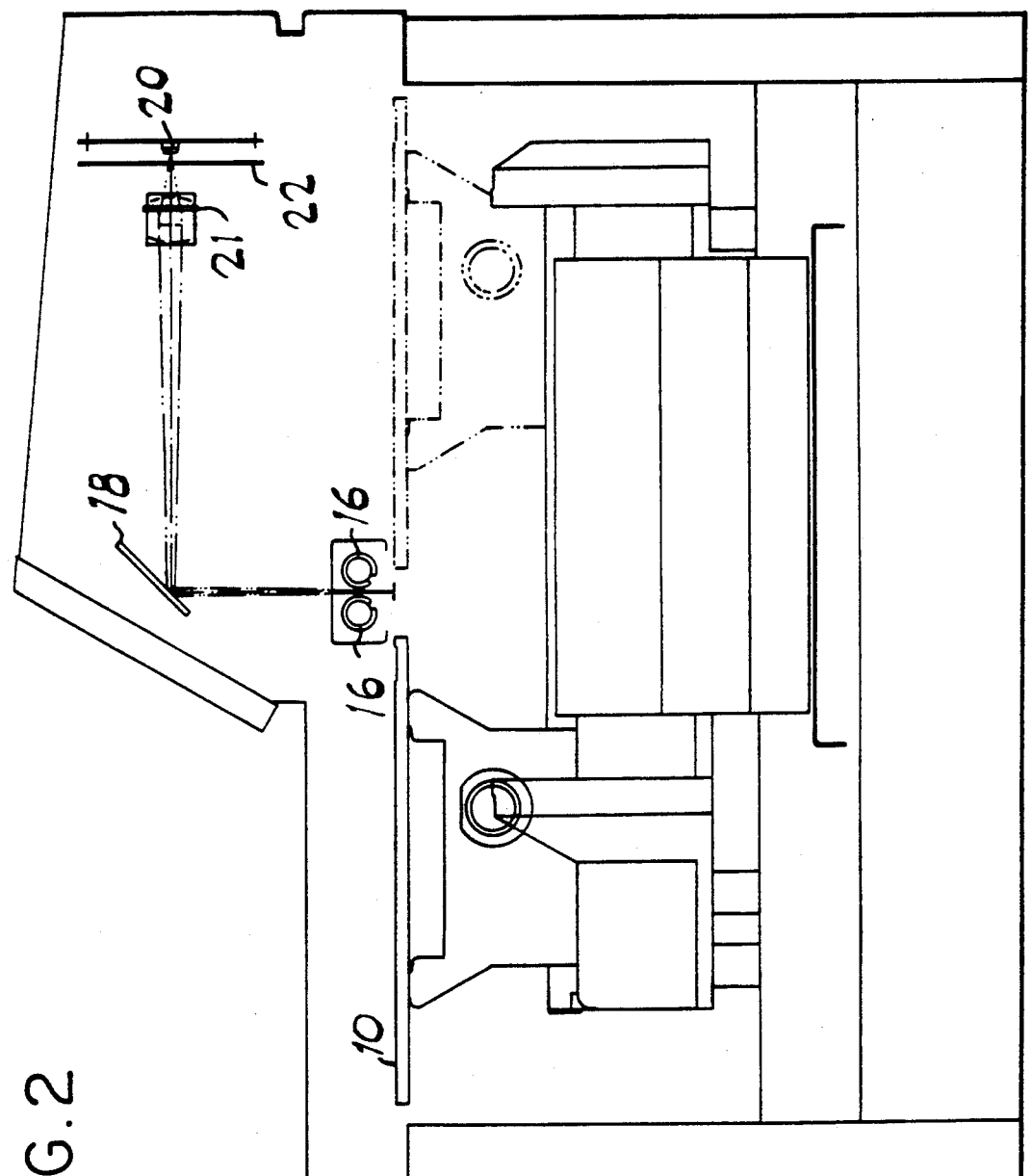
FIG. 2 is a side sectional view of a scanner according to the invention.

FIG. 1 shows a front sectional view and FIG. 2 shows a side sectional view of a scanner according to the invention, as more fully described in the foregoing application Ser. No. 07/241,101, now U.S. Pat. No. 4,899,217, which is hereby incorporated by reference in its entirety. In general, reference numeral 10 indicates a table with workpiece 12 (e.g., original color artwork) thereon. Table 10 is driven by table motor 12 using drive screw 14. Positioned above table 10 are fluorescent lights 16 and mirror 18.

Reference numeral 20 indicates a linear detector, such as a charge-coupled device (CCD), situated behind lens 21. Linear detector CCD 20 may be comprised of 2592 individual pixels. Lens 22 is positioned so as to focus light reflected from a linear portion of workpiece 12 via mirror 18 onto CCD 20. Filter wheel 22 is positioned between lens 21 and CCD 20 and is divided into twelve sectors each containing an individual red, green or blue filter 24. The filters are arranged such that on a single rotation of filter wheel 22, a filter pattern of the three colors (e.g., red, green, blue) will repeat four times. Fluorescent lights 16, individual filters 24, and CCD 20 are all chosen to provide a substantially balanced response throughout the color spectrum. An infrared filter may also be provided to reduce undesired response of the CCD detector in the infrared region of the spectrum.

Parallel to the direction of travel of table 10 is situated a rotatable drum 26 with a sheet of photosensitive material 28 able to be loaded and held onto the surface thereof for scanning exposure. In close proximity to rotatable drum 26 is a dot generator system including an LED array 30 adapted to expose the photosensitive material to produce a halftone image. Rotatable drum 26 is driven by drum motor 32. Filter wheel 22 is rotatably coupled to rotatable drum 26 so that one rotation of the drum corresponds to one rotation of the filter wheel.

Table motor 12 and drum motor 32 are controlled using phase-lock-loop (PLL) circuits with pulse width modulation. To ensure synchronization, the circuits are run off the same 16 MHz system clock. Encoders (not shown) are operatively connected to drum 26 and to table motor 12 as position/speed detectors, and may consist of commercially available 1000 increment position indicators which provide 1000 pulses per drum revolution and per motor revolution, respectively. Additionally, an index pulse once per revolution is provided at drum 26. It will be appreciated that a count of the pulses may provide a means for position determination at any point. The index pulse is synchronized with the beginning of a red filter on the filter wheel thereby providing position determination means for the filter wheel as well. It will also be appreciated that by using a single system clock, control problems are significantly reduced. If the system begins to drift, all components and circuits will drift together.

In accordance with the previously described embodiment, operation of the scanner will be described hereinafter.

Scanning is commenced when a scanning index mark associated with the lead edge of the workpiece reaches the lights 16. During scanning, the table 10 advances slowly and reflected light from linear portions of the workpiece are alternately detected through individual red, green and blue color filters 24. Preferably, scanned readings from one full filter wheel revolution are averaged for each color and correspond to one scan line to be exposed. For example, all readings through the four red filters are averaged to obtain red data used to determine the corresponding exposure data for one exposure scan line. This advantageously reduces color fringe effects and noise. This data averaging will be explained in greater detail below.

Figure 3:
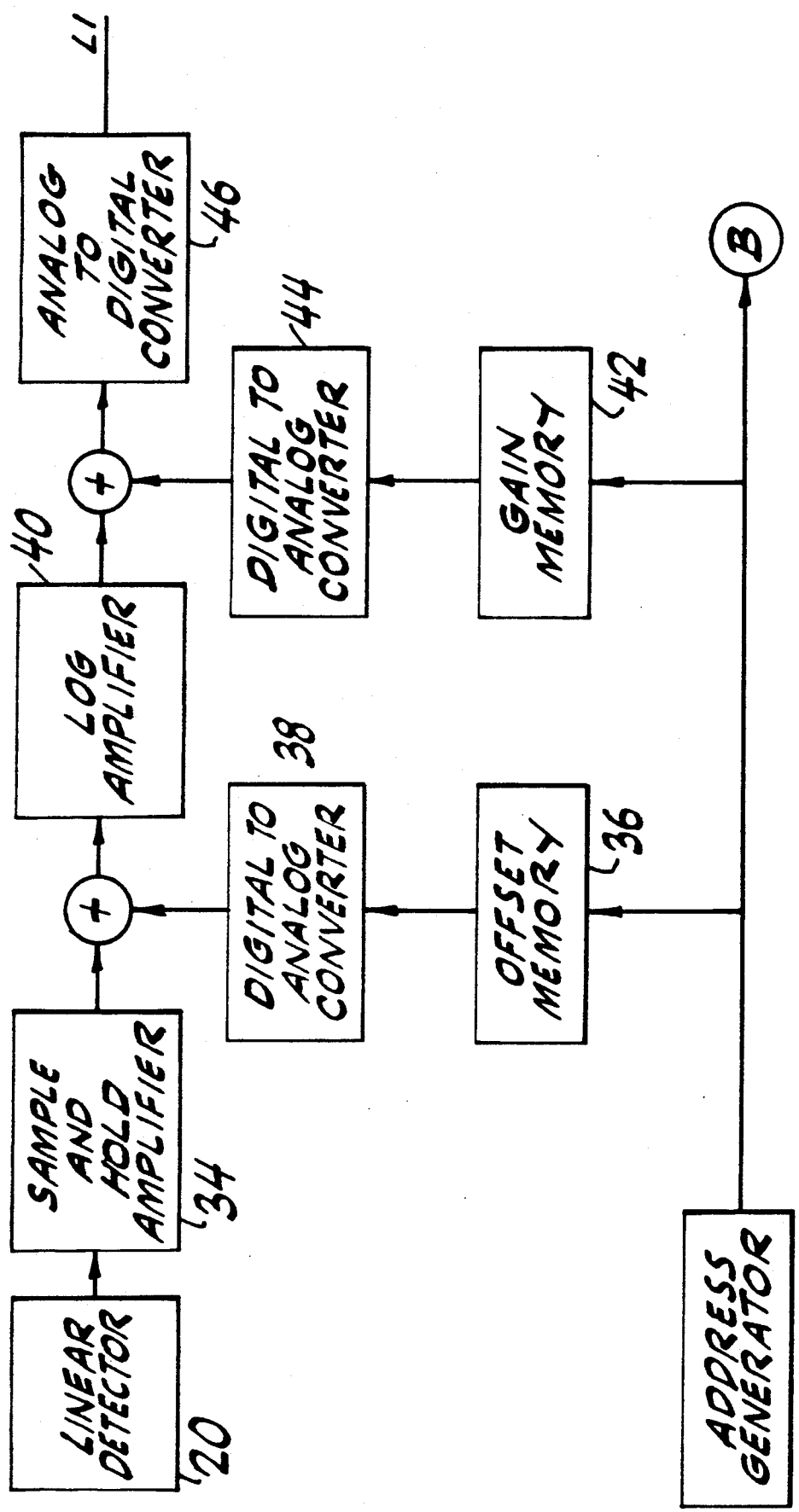
FIG. 3 is a block diagram according to the invention.
Figure 3:
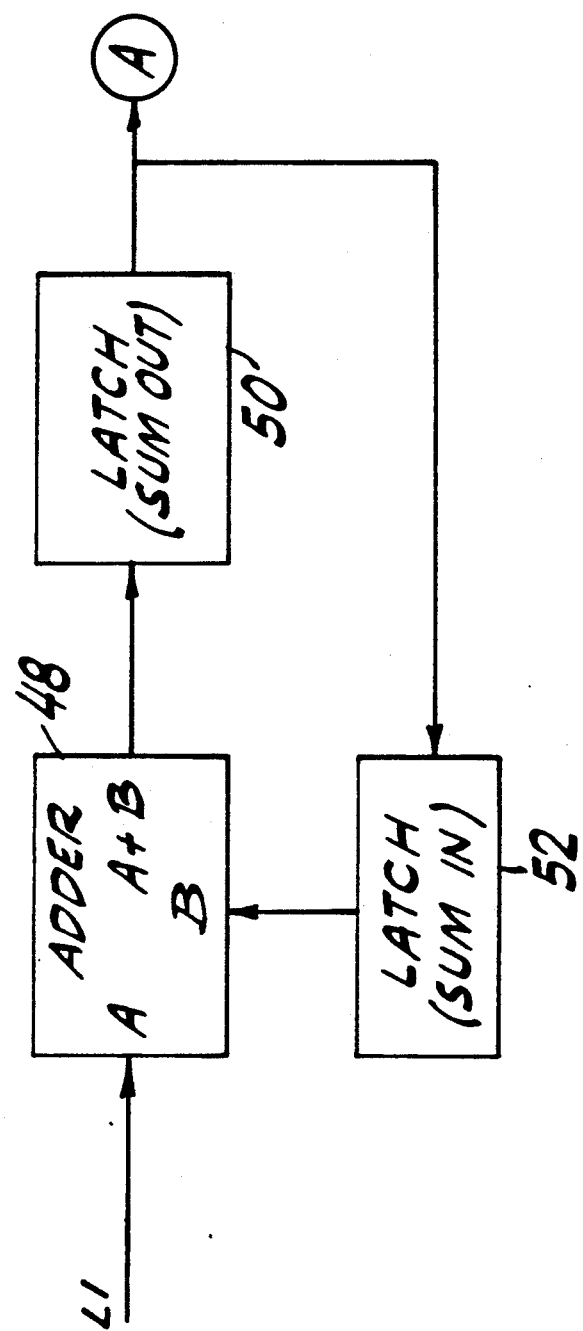

Referring to FIG. 3, light reflected from a linear portion of the workpiece passes through a linear aperture (not shown) and is reflected through an infrared filter (not shown), a lens 21 and a color filter 24 of filter wheel 22 to a charge coupled device ("CCD") linear detector 20. The light is reflected from workpiece 12 through mirror 18. As each filter 24 passes in front of the CCD 20, CCD 20 is exposed for the period of time that the filter is in front of the CCD (approximately 5 milliseconds). As each spoke on the filter wheel passes, a new color filter is brought into position. During a subsequent exposure, the data from the previous exposure is clocked out serially as an analog signal. The voltage of the analog signal is proportional to the reflectance of the workpiece at the particular pixel on the CCD.

The signal is thereafter passed through sample and hold amplifier 34. The sample and hold amplifier minimizes noise in the analog signal by sampling the signal at an area of interest (i.e., particular peaks, valleys, etc.).

The signal output from sample and hold amplifier 34 is then corrected by offset factors to minimize the effect of different pixel characteristics of the CCD on the data. Offset factors are stored digitally in offset memory 36 in the format of one factor for each pixel of the CCD (i.e., 2592 pixels). The offset factors are read out and converted to an analog signal by digital to analog converter 38 and are added to the signal output of sample and hold amplifier 34. This correction, added to the signal as it is strobed out of the CCD, serves to linearize the response of the system.

The analog signal, corrected for varying pixel characteristics, then passes through log amplifier 40 to compress the signal. The log amplifier serves to compress the data signal by converting the signal into a signal wherein the voltage is proportional to the reflection density, rather than the light intensity, of the workpiece.

The signal output from log amplifier 40 is then corrected for the effects of individual pixel characteristics, different colors, and lens differences. Gain factors (3 colors ×2592 pixels) stored digitally in gain memory 42 are read out and converted to an analog signal in digital to analog converter 44 and are multiplied by the signal output by the log amplifier 40. The resulting signal output is then converted by analog to digital converter 46 to a digital signal. As a result, the scan data output from each pixel of CCD 20 becomes a 6 bit data value.

Adder 48 takes the digital signal from analog to digital converter 46 and adds to it previous data values for that color taken during that rotation of the filter wheel. On the first red, green, and blue scan for each rotation of the filter wheel there are no previous data values, therefore, the adder skips the addition for the first three filter scans after an index pulse. These first values (3 colors×2592 pixels) are shifted to latch (sum out) 50 and latch (sum in) 52 and stored in random access memory, memory A 56. For the next set of three colors, the adder 48 adds the input data to that stored in memory A 56 after shifting the data from the previous set of three colors to latch (sum out) 50 and latch (sum in) 52. This process continues for the 4 exposures for each color filter scanned in a single rotation of the filter wheel 22. At the beginning of a new rotation, memories A and B need not be erased as the first set of three-color data passes through the adder 48 unaffected and overwrites the final data from the previous rotation that remains in memory A 56, latch (sum out) 50, and latch (sum in) 52. Similarly, the data in memory B 58 may be overwritten.

Figure 4:
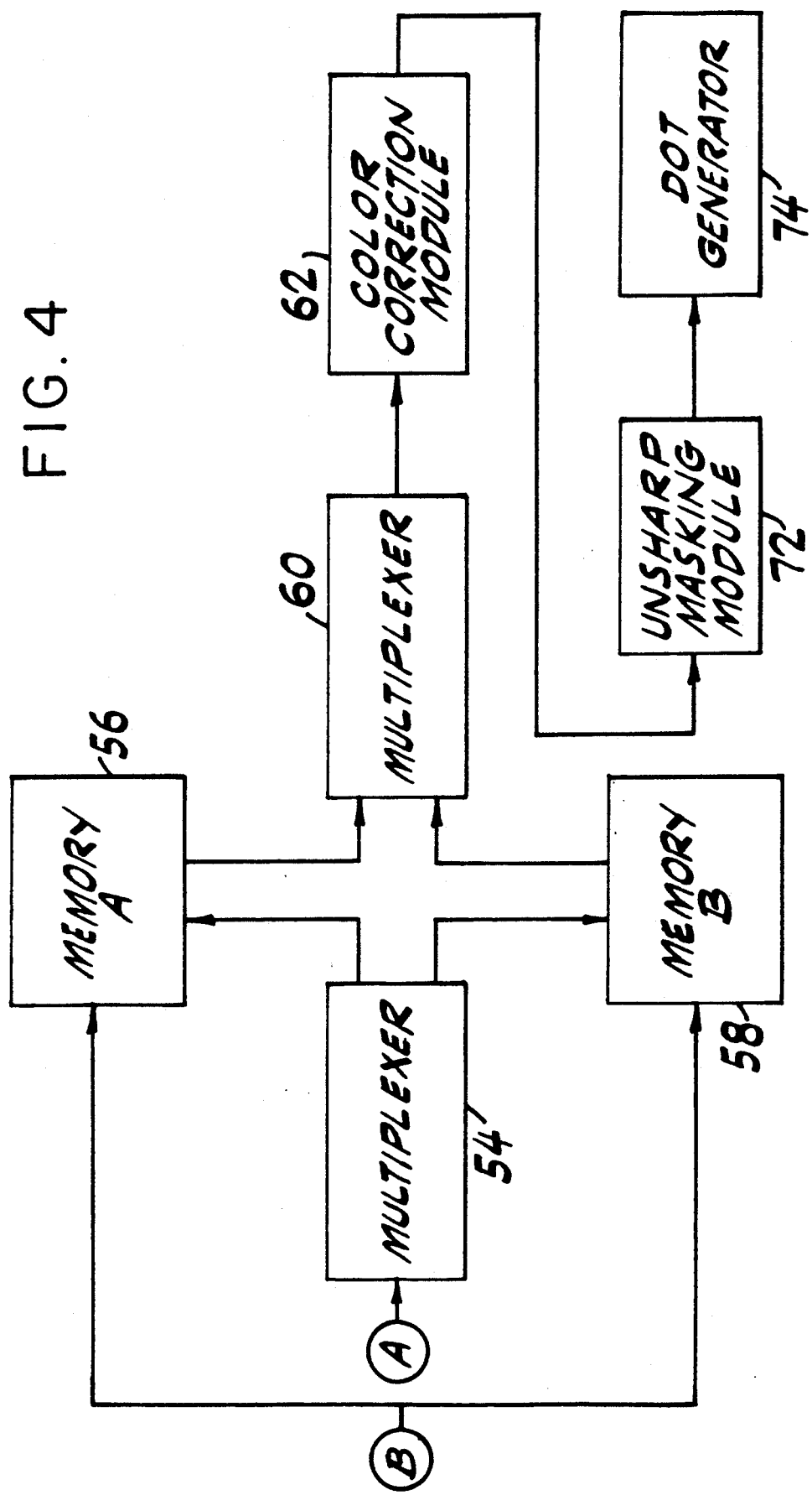
FIG. 4 is a block diagram according to the invention.

Referring to FIG. 4, the data output by adder 48 at the end of each rotation passes through multiplexer 54 and into memory A 56. The data values stored in memory A 56 is the sum of four exposures of each pixel for each color (3 colors×2592 pixels). On the completion of a revolution of the filter wheel 22, data input is switched by a control circuit (not shown), responsive to the drum index pulses, via multiplexers 54, 60 from memory A 56 to memory B 58. Such control circuits are well known in the art. This makes memory A 56 available for data output through multiplexer 60 to subsequent processes in the system (i.e., to the color correction module 62). It will be appreciated that since the LED array 30 outputs to the photosensitive material 28 at the same rate of movement as the scanning table to expose the halftone image line by line corresponding to the linear scans of the original, relatively little memory is required.

Figure 5:
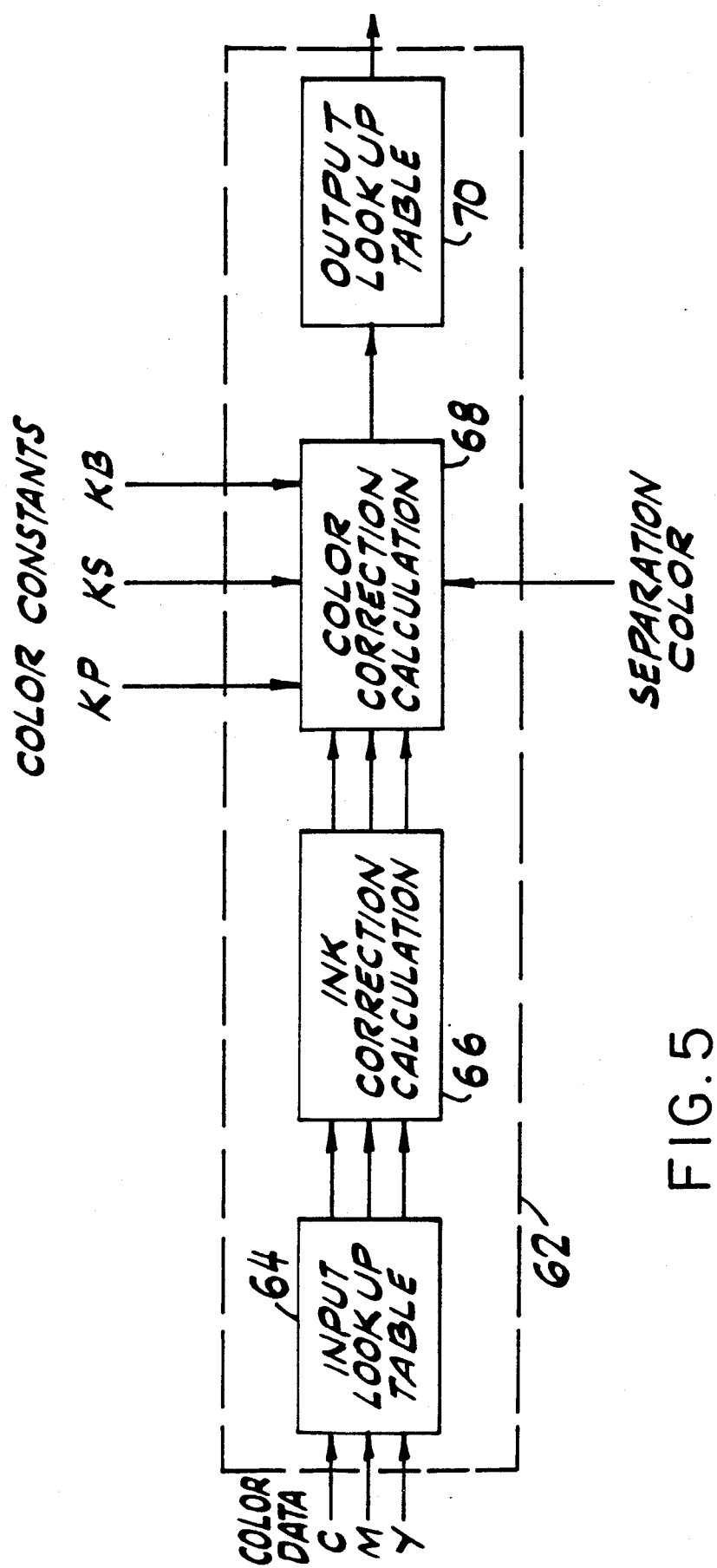
FIG. 5 is a data flow diagram of the color correction module according to the invention.

Referring to FIG. 5, data comes into the color correction module 62 as cyan, magenta and yellow data corresponding to the averaged red, green and blue scanned values for each workpiece pixel. As the data enters the color correction module, corrections are made for imperfections in the input data. The values in input lookup table 64 serve to adjust the balance between colors and perform curve shaping on the "gray scale" prior to mixing. The data is thereafter corrected for ink imperfections by the following formulas:

$$C_2 = 1.2 \times C_1 - 0.1 \times Y_1 - 0.1 \times M_1$$

$$M_2 = 1.94 \times M_1 - 0.2 \times Y_1 - 0.74 \times C_1$$

$$Y_2 = 2 \times Y_1 - 1 \times M_1$$

Wherein:
$C_1$ is the input cyan data value (prior to ink correction)
$C_2$ is the output cyan data value (after ink correction)
$M_1$ is the input magenta data value (prior to ink correction)
$M_2$ is the output magenta data value (after ink correction)
$Y_1$ is the input yellow data value (prior to ink correction)
$Y_2$ is the output yellow data value (after ink correction)

The coefficients in the above formulas are representative of typical values. It will be appreciated that the exact coefficient values change for different inks. The resulting data values are thereafter sorted to determine the maximum, middle, and minimum values for the three colors (e.g., cyan—maximum data value, magenta—middle data value, and yellow—minimum data value).

Once the data has been sorted from minimum to maximum data values, color differentials are calculated as follows:
CCP = maximum data value − middle data value
CCS = middle data value − minimum data value
K = minimum data value
Wherein:
CCP is the primary color correction data differential
CCS is the secondary color correction data differential
K is the base color data value or black value Thereafter, color constants for both the primary (maximum data value) and the secondary (middle data value) colors are looked up from memory. Color constants are stored as a primary and a secondary color constant for each color plus one for black (7 constants in all). The calculation of the color correction is as follows:

$$CC = Color + KP \times CCP + KS \times CCS + KB \times K$$

Wherein:
CC is the corrected color data
Color is the selected separation color
KP is the primary color constant (between −1 and +1)
CCP is the primary differential color
CCS is the secondary differential color
KS is the secondary color constant (between −1 and +1)
KB is the color constant for black (between 0 and −1)
K is the minimum color data value The corrected color data is finally adjusted using the factors stored in output lookup table 70 The information stored in output lookup table 70 reshapes the "gray scale" curve and may, for example, lessen the amount of black in the output or shift cyan to print darker in the entire range of output. The specific data values in output lookup table 70 may depend on paper used, ink used, and particular user preferences.

It will also be appreciated by those skilled in the art that the color correction module may by adapted to add additional features to the image being processed. For example, the color correction module may establish borders (white, black, etc.) around the image. The color correction module may also provide tinting or a lessening of the dot area if desired.

Referring to FIG. 4, the data from the color correction module 62 is transferred to unsharp masking module 72. The data entering the unsharp masking module 72 is a color corrected picture pixel value. When the unsharp masking module detects a change in data values exceeding a given level (e.g., 40%), the module exaggerates the amount of change to enhance the edge sharpness of the image. The enhancement of edge sharpness may be accomplished by averaging data from pixels surrounding the pixel to be exaggerated. In order to accomplish this averaging, the data for more than one line must be stored in the module. For each pixel, the data for the immediate surrounding pixels is used for sharpness enhancement. To average the pixels for sharpness enhancement using the immediately surrounding pixels (a 3 pixel × 3 pixel cube), three lines of data must be stored. It will be appreciated that averaging may be done utilizing more lines if desired. It will also be appreciated that, as this is the only point in the data stream that more than one line of data is held, a slight delay in the data stream from scanner input to output is introduced.

The data from the unsharp masking module 72 is outputted to the dot generator 74. Dot generator 74 may be adapted to work in cooperation with a laser dot generator (not shown) or, preferably, LED array 30 for printing on photosensitive material. A suitable dot generator including an LED array is disclosed in copending patent application Ser. No. 07/241,100, now U.S. Pat. No. 4,915,530, entitled HIGH RESOLUTION HALFTONE DOT GENERATOR SYSTEM INCLUDING LED ARRAY, the disclosure of this patent application is incorporated herein in its entirety by reference.

As will be appreciated from the foregoing description, table 10, rotating drum 26, and filter wheel 22 are driven in synchronization by motors 12, 32 throughout the scan, with the preferred LED array 30 exposing the photosensitive material on drum 26 as the table advances. Of course, exposure will lag input scanning slightly in order to permit processing of scanned data to generate appropriate exposure signals.

During scanning, CCD 20 views and detects a linear strip on the original artwork approximately 0.00352 inches wide and having a length sufficient to extend across the width of the color original. A linear strip of the original is detected through each individual filter 24 as the table advances. As will be readily appreciated, however, the scanning table will have advanced slightly between the respective scans through one set of individual filters 24. To compensate for any color fringe effects or input data smearing which might otherwise result from slight misalignment of the red, green and blue images, filter wheel 22 is preferably provided with four sets of color filters.

In the preferred embodiment, the four signals corresponding to any given filter color are effectively averaged to produce a single corresponding exposure signal. By way of example, all four detector signals corresponding to an individual red filter 24 are averaged and taken into account to generate corresponding exposure values for a single line to be exposed on the halftone separation. Advantageously, this eliminates color fringe effects and input data smearing which might otherwise be introduced by the slight positional displacement of corresponding red, green and blue linear scans due to continuous scanning table movement. In addition, the multiple scan and averaging technique effectively compensates for dust interference and other aberrational effects which may be introduced during a single scan. The multiple scan and averaging technique allows the use of a continuous drive table eliminating the need for the workpiece to be moved in a step-wise fashion.

Signals from the CCD 20 are processed to activate the individual LED's of LED array 30 as drum 26 bearing photosensitive material rotates at high speed. Advantageously, the exposure of LED array 30 is advanced simultaneously with the table, thereby eliminating the need for an additional synchronized motor to drive the exposure head axially across the drum surface.

Although the scanner scans the original for red, green and blue data as the table is advanced, only one halftone separation is exposed during one cycle of movement of the table from the first table position to the last table position. Thus, four passes with the table are required to produce four halftone separations. In the preferred embodiment, a minimum of scanned workpiece data is stored, with scanning and exposure being performed essentially "on the fly" for each halftone separation. Of course, it is also contemplated that memory could be provided to store the scanned information so that input scanning could be performed only on the first scan, with the input scanning elements being deactivated during subsequent passes to expose the remaining halftone separations from one set of scanned original data.

While the invention has been described in its preferred embodiments, it is to be understood that the words which have been used are words of description, rather than limitation, and that changes may be made within the purview of the appended claims without departing from the true scope and spirit of the invention in its broader aspects. For example, incorporation of a calibration step is also contemplated. Thus, for calibration the scanning table is advanced until a white calibration standard is disposed beneath lights 16. Readings are taken and electrical adjustments are made based on the white reading and the data for the gain memory are obtained. Thereafter, movable a neutral density filter is interposed in the optical path and a low light level or "dark" calibration reading is taken and the data for the offset memory are obtained. It is also contemplated that either or both of the foregoing calibration steps may be performed at the beginning of each scan or at the beginning of the first of four scans for a set of halftone separations.

What is claimed:

1. A data input apparatus for a color separation scanner, comprising
   (a) a continuously movable support for a workpiece;
   (b) a linear detector adapted to scan individual pixels across a linear portion of said workpiece;
   (c) means for interposing at least one color filter between said workpiece and said linear detector;
   (d) means for averaging individual pixel data received from multiple successive scans of said workpiece by said linear detector; and
   (e) means for storing said averaged data.

2. The data input apparatus according to claim 1, wherein said movable support comprises a scanning table.

3. The data input apparatus according to claim 1, wherein said linear detector comprises a charge-coupled device.

4. The data input apparatus according to claim 1, wherein said means for interposing at least one color filter comprises a filter wheel.

5. The data input apparatus according to claim 1, wherein said at least one color filter comprises at least one set of red, green and blue filters.

6. The data input apparatus according to claim 5, wherein said at least one set of red, green, and blue filters comprises four sets of red, green and blue filters.

7. The data input apparatus according to claim 6 wherein said means for averaging data is adapted to average data from corresponding red, green and blue filters.

8. The data input apparatus according to claim 1 wherein said means for averaging the data received from multiple scans of the workpiece comprises an adder for summing the data.

9. The data input apparatus according to claim 1, wherein said means for storing said averaged data comprises a random access memory.

10. A data input method for a color separation scanner, comprising the steps of:
    (a) continuously movable supporting a workpiece;
    (b) scanning individual pixels across a linear portion of said workpiece with a linear detector;
    (c) interposing at least one color filter between said workpiece and said linear detector;
    (d) averaging individual pixel data received from multiple successive scanning of said workpiece with said linear detector; and
    (e) storing said averaged individual pixel data.

11. The data input method according to claim 10, wherein said step of interposing at least one color filter comprises rotatably interposing at least one color filter using a filter wheel.

12. The data input method according to claim 10, wherein said step of interposing at least one color filter comprises interposing at least one red, green and blue filter.

13. The data input method according to claim 12, wherein the step of interposing at least one red, green, and blue filter comprises interposing four red, green and blue filters.

14. The data input method according to claim 13, wherein said step of averaging data includes averaging data from corresponding red, green, and blue filters.

15. The data input method according to claim 10, wherein said step of averaging data obtained from multiple scanning said workpiece comprises summing data for each color.

16. A color separation scanner, comprising:

(a) a continuously movable support for a workpiece;
(b) a linear detector for scanning a linear portion of said workpiece;
(c) means for interposing at least one color filter between said workpiece and said linear detector;
(d) first storage means for storing data from said linear detector;
(e) second storage means for storing data from said linear detector;
(f) switching means for switching between said first storage means and said second storage means;
(g) a continuously movable support for photosensitive material; and
(h) means for printing said stored data on said photosensitive material, wherein said printing means travels in conjunction with said continuously movable support for said workpiece.

17. The color separation scanner of claim 16, wherein said movable support for a workpiece comprises a scanning table.

18. The color separation scanner of claim 16, wherein said linear detector comprises a charge-coupled device.

19. The color separation scanner according to claim 16, wherein said means for interposing at least one color filter comprises a filter wheel.

20. The color separation scanner according to claim 16, wherein said at least one color filter comprises at least one set of red, green and blue filters.

21. The color separation scanner according to claim 17, wherein said at least one set of red, green, and blue filters comprises four sets of red, green and blue filters.

22. The color separation scanner according to claim 16, further comprising means for averaging the data received from multiple scans of the workpiece.

23. The color separation scanner according to claim 16, wherein said first and second storage means for storing said data comprises random access memory.

24. A method of color separation scanning, comprising the steps of:
(a) movably supporting a workpiece;
(b) scanning a linear portion of said workpiece with a linear detector;
(c) interposing at least one color filter between said workpiece and said linear detector;
(d) storing data obtained from said scan in a first storage means
(e) switching the storage of data to a second storage means at the completion of a scan;
(f) outputting data from the first storage means to be printed while data is being stored in said first storage means.

25. The method of color separation scanning according to claim 24, wherein said step of interposing at least one color filter comprises rotatably interposing at least one color filter using a filter wheel.

26. The method of color separation scanning according to claim 24, wherein said step of interposing at least one color filter comprises interposing at least one red, green and blue filter.

27. The method of color separation scanning according to claim 26, wherein the step of interposing at least one red, green, and blue filter comprises interposing four red, green and blue filters.

28. The method of color separation scanning according to claim 24, wherein said step of averaging data obtained from multiple scanning said workpiece comprises summing data values for each color.

29. The color separation scanner according to claim 22, wherein said means for averaging the data received from multiple scans of the workpiece comprises an adder for summing data.

* * * * *